US012803216B2

(12) United States Patent
Marui et al.

(10) Patent No.: US 12,803,216 B2
(45) Date of Patent: Nov. 17, 2026

(54) CONNECTOR WITH ELECTRIC WIRE

(71) Applicant: Sumitomo Electric Industries, Ltd., Osaka (JP)

(72) Inventors: Ryo Marui, Osaka (JP); Fumiya Nishijima, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 362 days.

(21) Appl. No.: 18/709,317

(22) PCT Filed: Oct. 3, 2022

(86) PCT No.: PCT/JP2022/036966
§ 371 (c)(1),
(2) Date: May 10, 2024

(87) PCT Pub. No.: WO2023/100466
PCT Pub. Date: Jun. 8, 2023

(65) Prior Publication Data

US 2025/0015532 A1 Jan. 9, 2025

(30) Foreign Application Priority Data

Nov. 30, 2021 (JP) ................................ 2021-194960

(51) Int. Cl.

| | |
|---|---|
| ***H01R 13/533*** | (2006.01) |
| ***B60L 53/16*** | (2019.01) |
| ***B60L 53/302*** | (2019.01) |

(52) U.S. Cl.
CPC ............ *H01R 13/533* (2013.01); *B60L 53/16* (2019.02); *B60L 53/302* (2019.02); *H01R 2201/26* (2013.01)

(58) Field of Classification Search
CPC ..... B60L 53/302; B60L 53/16; H01R 13/005; H01R 13/533; H01R 2201/26
USPC .................................... 439/3, 190, 196, 485
See application file for complete search history.

(56) References Cited

U.S. PATENT DOCUMENTS

| | | | |
|---|---|---|---|
| 2019/0036254 | A1 | 1/2019 | Moseke |
| 2019/0315239 | A1 | 10/2019 | Beimdieck et al. |

FOREIGN PATENT DOCUMENTS

| | | | |
|---|---|---|---|
| CN | 108372794 | A | 8/2018 |
| CN | 109788713 | A | 5/2019 |
| CN | 211017485 | U | 7/2020 |
| CN | 112713414 | A | 4/2021 |
| CN | 212991393 | U | 4/2021 |
| CN | 112838401 | A | 5/2021 |

(Continued)

*Primary Examiner* — Christopher M Koehler
*Assistant Examiner* — Gregory L Mangot
(74) *Attorney, Agent, or Firm* — Volpe Koenig

(57) ABSTRACT

Provided is an electric-wire-equipped connector used for charging an electric vehicle or discharging the electric vehicle. The electric-wire-equipped connector includes a connector, an electric wire, and a connection part. The connector includes a rod-shaped terminal to be connected to a socket terminal provided in the electric vehicle. The terminal includes a first flow path through which a refrigerant flows inside the terminal. The electric wire includes a conductor, and a second flow path through which the refrigerant flows along a longitudinal direction of the conductor. The connection part connects the terminal and the conductor, and includes a third flow path that allows the first flow path and the second flow path to communicate with each other.

8 Claims, 9 Drawing Sheets

(56) References Cited

FOREIGN PATENT DOCUMENTS

| | | | |
|---|---|---|---|
| CN | 213109037 | U | 5/2021 |
| JP | 2019-511093 | A | 4/2019 |
| JP | 2019-517714 | A | 6/2019 |

CONNECTOR WITH ELECTRIC WIRE

TECHNICAL FIELD

The present disclosure relates to an electric-wire-equipped connector. This application claims priority on Japanese Patent Application No. 2021-194960 filed on Nov. 30, 2021, the entire content of which is incorporated herein by reference.

BACKGROUND ART

PATENT LITERATURE 1 and PATENT LITERATURE 2 each disclose a connector used for rapid charging of electric vehicles. The connector is connected to the tip of a charging cable.

The connector disclosed in PATENT LITERATURE 1 includes a hollow terminal. The hollow interior of the terminal communicates with a cooling tube provided inside the charging cable. A refrigerant flows through the cooling tube. In the connector of PATENT LITERATURE 1, although a conductor of the charging cable and the terminal of the connector are cooled by the refrigerant, a place where the terminal and the conductor are connected to each other is not cooled.

The connector disclosed in PATENT LITERATURE 2 includes a connection part that connects a terminal of the connector to a conductor of a charging cable. The connection part includes a hollow chamber in which a refrigerant can flow, and an opening that faces a cooling tube of the charging cable. The hollow chamber of the connection part communicates with the cooling tube provided inside the charging cable, via the opening. The refrigerant flows through the cooling tube. In the connector of PATENT LITERATURE 2, although the conductor of the charging cable and the connection part are cooled by the refrigerant, the terminal of the connector is not cooled.

CITATION LIST

Patent Literature

PATENT LITERATURE 1: Chinese Laid-Open Patent Publication No. 108372794

PATENT LITERATURE 2: Japanese Laid-Open Patent Publication (translation of PCT application) No. 2019-517714.

SUMMARY OF THE INVENTION

An electric-wire-equipped connector according to the present disclosure is used for charging an electric vehicle or discharging the electric vehicle, and includes a connector, an electric wire, and a connection part. The connector includes a rod-shaped terminal to be connected to a socket terminal provided in the electric vehicle. The terminal includes a first flow path through which a refrigerant flows inside the terminal. The electric wire includes a conductor, and a second flow path through which the refrigerant flows along a longitudinal direction of the conductor. The connection part connects the terminal and the conductor, and includes a third flow path that allows the first flow path and the second flow path to communicate with each other.

DETAILED DESCRIPTION

Figure 1:
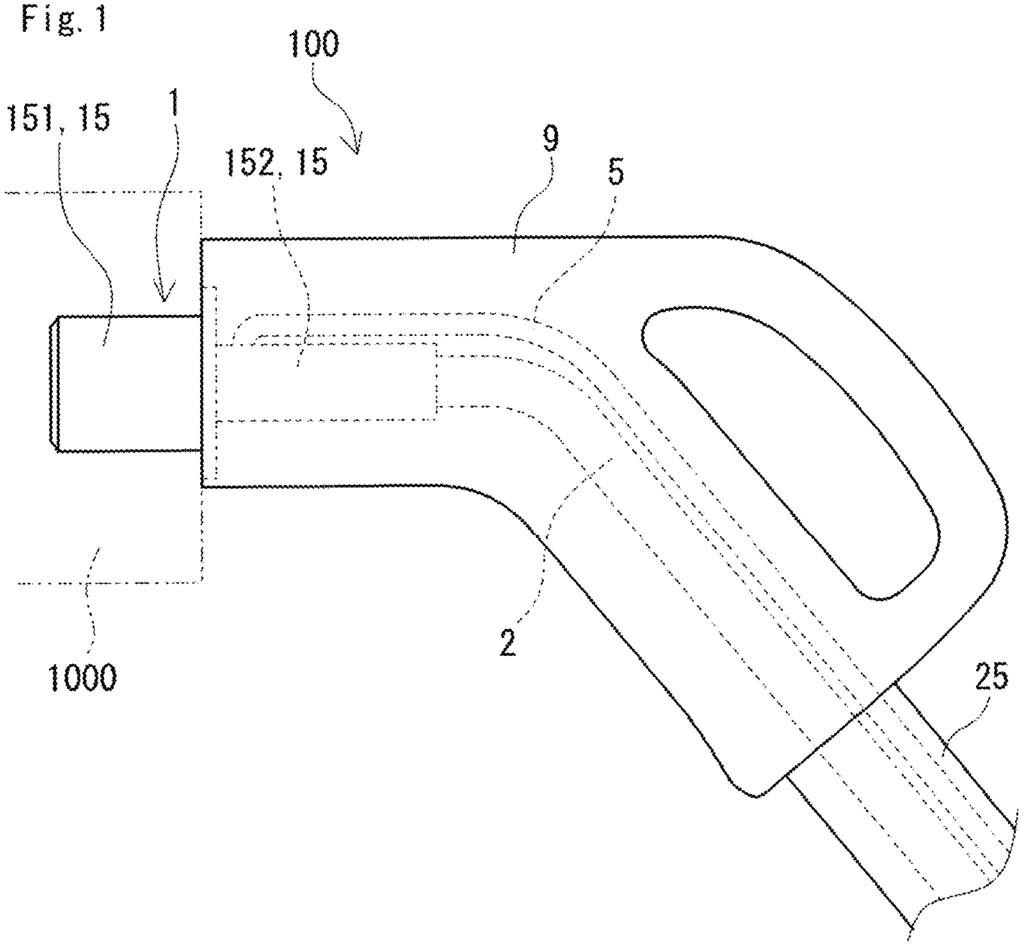
FIG. 1 is a side view schematically showing a use state of an electric-wire-equipped connector according to embodiment 1.

Problems to be Solved by the Present Disclosure

In electric vehicles such as a battery electric vehicle (BEV) and a plug-in hybrid electric vehicle (PHEV), rapid charging with a large current is being studied in terms of reducing the charging time. Rapid charging with a large current causes heat generation in a first connection place where a socket terminal provided in an electric vehicle is connected to a terminal of a connector, and causes heat generation in a second connection place where the terminal of the connector is connected to a conductor of a charging cable. In addition, rapid charging with a large current also causes heat generation in the conductor of the charging cable itself. It is desired to cool each of high-temperature spots due to such heat generation.

One object of the present disclosure is to provide an electric-wire-equipped connector capable of efficiently cooling a plurality of high-temperature spots, and realizing miniaturization.

Effects of the Present Disclosure

The electric-wire-equipped connector according to the present disclosure can efficiently cool a plurality of high-temperature spots, and realize miniaturization.

DESCRIPTION OF EMBODIMENTS OF THE PRESENT DISCLOSURE

First, embodiments of the present disclosure will be listed and described.

(1) An electric-wire-equipped connector according to an embodiment of the present disclosure is used for charging an electric vehicle or discharging the electric vehicle, and includes a connector, an electric wire, and a connection part. The connector includes a rod-shaped terminal to be connected to a socket terminal provided in the electric vehicle. The terminal includes a first flow path through which a refrigerant flows inside the terminal. The electric wire includes a conductor, and a second flow path through which the refrigerant flows along a longitudinal direction of the conductor. The connection part connects the terminal and the conductor, and includes a third flow path that allows the first flow path and the second flow path to communicate with each other.

The electric-wire-equipped connector according to the present disclosure can efficiently cool a plurality of high-temperature spots. The plurality of high-temperature spots include a first connection place, a second connection place, and the conductor of the electric wire. The first connection place is a place where a socket terminal provided in an electric vehicle is connected to the terminal of the connector. The second connection place is a place where the terminal of the connector is connected to the conductor of the electric wire. The first connection place is cooled by the refrigerant that flows through the first flow path. The second connection place is cooled by the refrigerant that flows through the third flow path. The conductor of the electric wire is cooled by the refrigerant that flows through the second flow path. The first flow path, the second flow path, and the third flow path communicate with each other. The same refrigerant flows through the first flow path, the second flow path, and the third flow path. The electric-wire-equipped connector of the present disclosure can cool the plurality of high-temperature spots with a series of flow paths. Cooling with the series of flow paths allows the high-temperature spots to be efficiently cooled, compared to the case where the refrigerant is circulated for each of the high-temperature spots.

The electric-wire-equipped connector of the present disclosure can realize miniaturization. In the electric-wire-equipped connector of the present disclosure, the connection part has both the function of connecting the terminal and the conductor, and the function of allowing the first flow path and the second flow path to communicate with each other. The connection part having the above two functions allows the connector to be more easily miniaturized, compared to the case where the above two functions are separately achieved.

(2) As one configuration of the electric-wire-equipped connector according to the present disclosure, the terminal includes an accommodation part in which the connection part is inserted, and an inner circumferential surface of the accommodation part and an outer circumferential surface of the connection part are coupled to each other.

In the above configuration, since the connection part is housed in the terminal, the electric-wire-equipped connector can be further miniaturized.

(3) As one configuration of the electric-wire-equipped connector of the present disclosure according to the above (2), the connection part includes a first tubular portion, a second tubular portion, and a coupling part. The first tubular portion is located on a front end side of the terminal, and includes an inner circumferential surface coupled to an outer circumferential surface of the conductor, and an outer circumferential surface that forms the first flow path between itself and the inner circumferential surface of the accommodation part. The second tubular portion is located on a rear end side of the terminal with respect to the first tubular portion, and includes an inner circumferential surface that forms a part of the third flow path between itself and the outer circumferential surface of the conductor, and an outer circumferential surface coupled to the inner circumferential surface of the accommodation part. The coupling part includes a plurality of short pieces that couple the first tubular portion to the second tubular portion, and a plurality of communication openings formed between adjacent short pieces. Each of the plurality of communication openings is connected to the first flow path.

In the above configuration, the conductor can be crimped to the first tubular portion of the connection part, whereby conduction between the terminal and the conductor can be satisfactorily ensured via the connection part. In the above configuration, the third flow path can be formed by the second tubular portion and the coupling part of the connection part, whereby the first flow path and the second flow path can be made to satisfactorily communicate with each other.

(4) As one configuration of the electric-wire-equipped connector of the present disclosure according to the above (2) or (3), the inner circumferential surface of the accommodation part and the outer circumferential surface of the connection part are screwed to each other.

In the above configuration, the terminal and the connection part can be easily and reliably connected to each other.

(5) As one configuration of the electric-wire-equipped connector according to the present disclosure, the connector includes a first pipe fixed to the terminal, and the first flow path allows an inside of the first pipe and the third flow path to communicate with each other.

In the above configuration, the refrigerant that cools the first connection place, the second connection place, and the conductor of the electric wire can be made to flow in one direction. For example, when the first pipe is a pipe for supplying the refrigerant, the refrigerant is supplied from the first pipe to the first flow path, and flows through the first flow path, the third flow path, and the second flow path in order. The refrigerant that has flowed through the second flow path is returned to the cooling device. The refrigerant returned to the cooling device again flows through the first pipe. When the first pipe is a pipe for discharging the refrigerant, the refrigerant flows through the second flow path, the third flow path, and the first flow path in order, and is discharged from the first flow path to the first pipe. The refrigerant discharged to the first pipe is returned to the cooling device. The refrigerant returned to the cooling device again flows through the second flow path.

(6) As one configuration of the electric-wire-equipped connector of the present disclosure according to the above (5), the connector includes a housing that covers the terminal, the housing has a through hole in which the first pipe is inserted, and the connector includes a first seal member disposed between an inner circumferential surface of the through hole and the first pipe.

In the above configuration, intrusion of water from the through hole into the housing can be inhibited.

(7) As one configuration of the electric-wire-equipped connector of the present disclosure according to the above (6), the first seal member has an extended part located outside the housing, and the extended part has a tapered shape in which a height on an inner circumferential side is higher than a height on an outer circumferential side.

In the above configuration, water is not likely to be collected on the distal side of the extended part, whereby intrusion of water from the through hole into the housing can be easily inhibited.

(8) As one configuration of the electric-wire-equipped connector according to the present disclosure, the electric wire includes a second pipe that covers the conductor, and forms the second flow path between itself and the conductor, the connection part has an outer circumferential surface that faces an inner circumferential surface of the second pipe, and the connector includes a fixture that fixes the second pipe to the connection part, with the inner circumferential surface of the second pipe and the outer circumferential surface of the connection part facing each other.

In the above configuration, the second pipe can be firmly and easily fixed to the connection part.

(9) As one configuration of the electric-wire-equipped connector of the present disclosure according to the above (1) to (5), the connector includes a housing that covers the terminal, the housing includes a draw-out hole through which the electric wire is drawn out, and the connector includes a second seal member disposed between an inner circumferential surface of the draw-out hole and the electric wire.

In the above configuration, intrusion of water from the draw-out hole into the housing can be inhibited.

DETAILS OF EMBODIMENTS OF THE PRESENT DISCLOSURE

Hereinafter, specific examples of the electric-wire-equipped connector according to the present disclosure will be described with reference to the drawings. In the drawings, the same reference signs denote the same or corresponding components. In each drawing, some components may be shown in a partially exaggerated or simplified manner for the convenience of description. A dimension ratio of each part may be different from an actual one. It is noted that the present disclosure is not limited to these examples, but is defined by the scope of claims and is intended to include meaning equivalent to the scope of the claims and all modifications within the scope.

Embodiment 1

Figure 2:
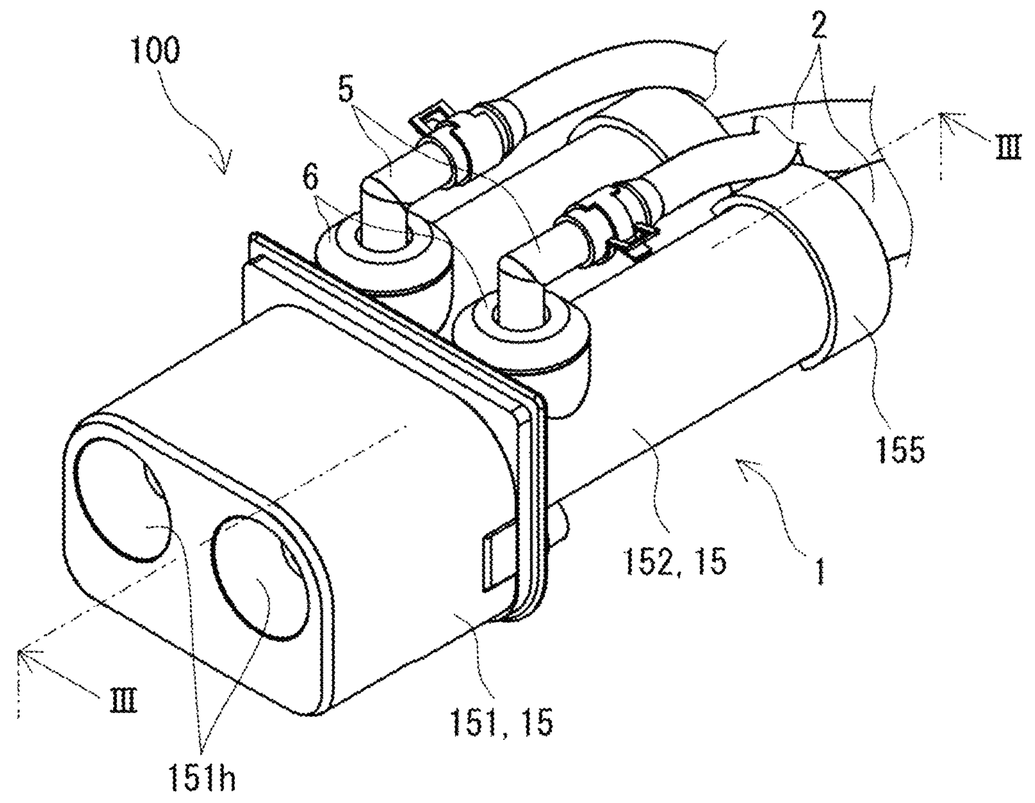
FIG. 2 is a perspective view schematically showing the inside of the electric-wire-equipped connector according to embodiment 1.
Figure 3:
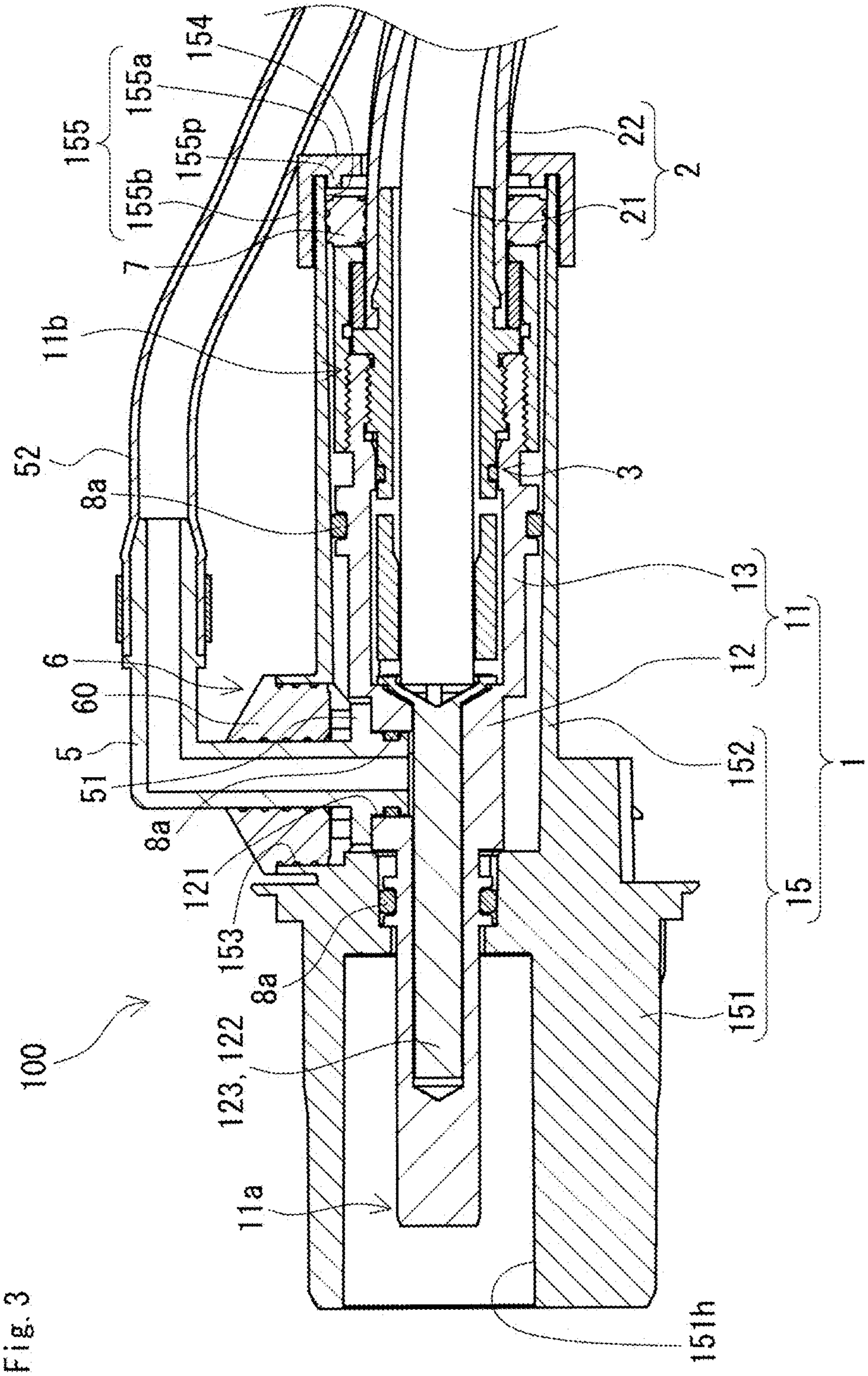
FIG. 3 is a cross-sectional view taken along a line III-III in FIG. 2.
Figure 4:
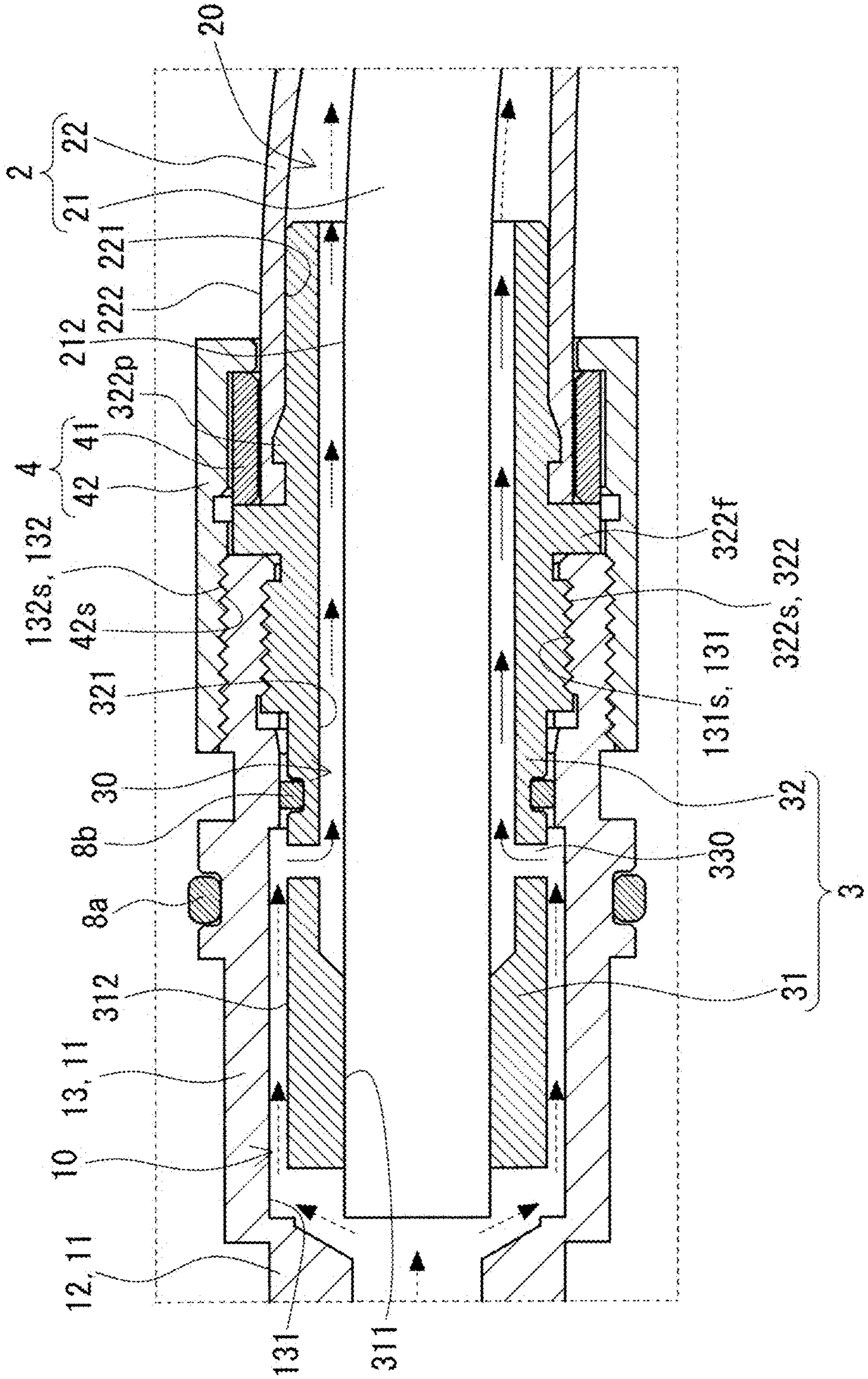
FIG. 4 is a cross-sectional view schematically showing a place where a terminal, an electric wire, and a connection part of the electric-wire-equipped connector according to embodiment 1 are connected to each other.
Figure 5:
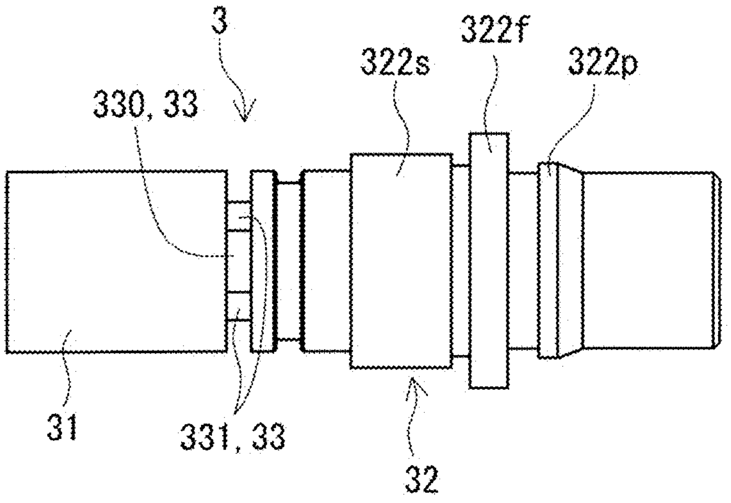
FIG. 5 is a side view of the connection part of the electric-wire-equipped connector according to embodiment 1.
Figure 6:
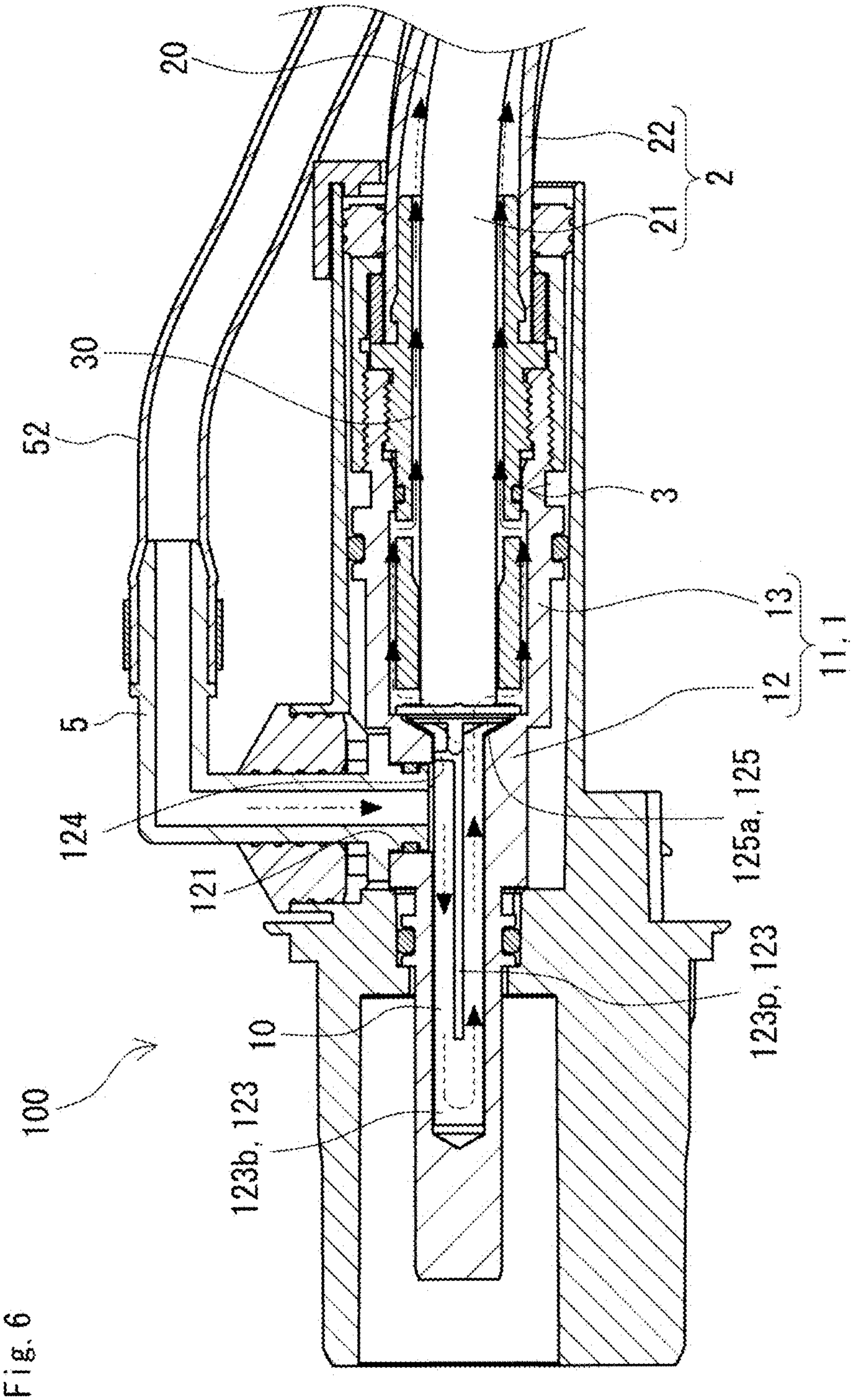
FIG. 6 illustrates a flow of a refrigerant in the electric-wire-equipped connector according to embodiment 1.

With reference FIG. 1 to FIG. 6, an electric-wire-equipped connector 100 according to embodiment 1 will be described. FIG. 1 shows a state in which the electric-wire-equipped connector 100 is inserted in an inlet 1000 of an electric vehicle. In FIG. 1, the inside of a case 9, which configures an appearance of the electric-wire-equipped connector 100, is simply indicated by broken lines. FIG. 2 shows a state in which the case 9 is removed, i.e., the inside of the electric-wire-equipped connector 100. In the electric-wire-equipped connector 100, as shown in FIG. 3, a terminal 11 of a connector 1 and a conductor 21 of an electric wire 2 are linearly connected by a connection part 3. FIG. 3, FIG. 4, and FIG. 6 each show a vertical cross-section taken along a plane that passes a center axis of the terminal 11 and a center axis of the conductor 21 so as to include a connection area where the terminal 11 and the conductor 21 are connected. FIG. 4 shows the connection area in an enlarged manner. FIG. 6 shows a flow of a refrigerant in the structure shown in FIG. 3. FIG. 5 shows the connection part 3 before being mounted to the electric-wire-equipped connector 100. In the following description, a side, of the electric-wire-equipped connector 100, to be inserted in the inlet 1000 (see FIG. 1) may be referred to as a front end side, and a side, of the connector 100, on which the electric wire 2 is connected to the connector 1 may be referred to as a rear end side.

The electric-wire-equipped connector 100 according to embodiment 1 is used for charging the electric vehicle or discharging the electric vehicle. The electric vehicle is a vehicle equipped with at least a rechargeable battery. The battery may be capable of discharging to an external device. The external device may be a power conditioner or the like. The electric vehicle may be a battery electric vehicle (BEV) or a plug-in hybrid electric vehicle (PHEV).

The electric-wire-equipped connector 100 according to embodiment 1 includes a connector 1, an electric wire 2, and a connection part 3, as shown in FIG. 3. The connector 1 includes a rod-shaped terminal 11. As shown in FIG. 4, the terminal 11 includes a first flow path 10 through which a refrigerant flows inside the terminal 11. The electric wire 2 includes a second flow path 20 through which the refrigerant flows along the longitudinal direction of the conductor 21. The connection part 3 connects the terminal 11 and the conductor 21. One of the features of the electric-wire-equipped connector 100 of embodiment 1 is that the connection part 3 includes a third flow path 30 that allows the first flow path 10 and the second flow path 20 to communicate with each other, as shown in FIG. 4. The first flow path 10, the second flow path 20, and the third flow path 30 communicate with each other. The first flow path 10, the second flow path 20, and the third flow path 30 form a series of refrigerant flow paths in the electric-wire-equipped connector 100. Hereinafter, the configuration of the electric-wire-equipped connector 100 will be described first, and thereafter, flow of the refrigerant will be described.

<<Connector>>

As shown in FIG. 3, the connector 1 includes the terminal 11 and a housing 15.

[Terminal]

The terminal 11 is a power terminal that supplies power to the electric vehicle. The shape, size, configuration, etc., of the terminal 11 are designed according to a predetermined standard. The standard for the connector for the electric vehicle may be, for example, ChaoJi. The material of the terminal 11 may be, for example, copper alloy or the like.

The terminal 11 is a rod-shaped member having a first end part 11*a* and a second end part 11*b*. The terminal 11 is a male terminal. The first end part 11*a* is located on the front end side of the connector 1. The second end part 11*b* is located on the rear end side of the connector 1. The first flow path 10 shown in FIG. 4 and FIG. 6 is provided inside the terminal 11.

The terminal 11 is connected to a socket terminal (not shown) provided in the electric vehicle. The socket terminal is a female terminal. The socket terminal has a tubular portion in which the terminal 11 is inserted. The first end part 11*a* of the terminal 11 is inserted in the socket terminal. In the terminal 11, with the first end part 11*a* being inserted in the socket terminal, an outer surface of the first end part 11*a* is electrically connected to the socket terminal. A first connection place where the terminal 11 and the socket terminal are connected, and its vicinity is a high-temperature spot.

As shown in FIG. 3 and FIG. 4, the second end part 11*b* includes an accommodation part 13 that opens at an end surface on the rear end side. The accommodation part 13 has a tubular shape. The axis of the accommodation part 13 and the axis of the terminal 11 are coaxial. The accommodation part 13 is disposed from the end surface on the rear end side to a position just before the center in the longitudinal direction of the terminal 11. The accommodation part 13 of this embodiment has a circular cross section corresponding to an outer diameter of the connection part 3 described later. The cross section of the accommodation part 13 is a cross section taken along a direction orthogonal to the axial direction of the accommodation part 13. The connection part 3 is inserted in the accommodation part 13. An inner circumferential surface 131 of the accommodation part 13 and an outer circumferential surface 322 of the connection part 3 are coupled to each other. In this embodiment, the inner circumferential surface 131 of the accommodation part 13 is provided with an internal thread 131*s* as shown in FIG. 4. In this embodiment, the outer circumferential surface 322 of the connection part 3 is provided with an external thread 322*s* as shown in FIG. 4. In this embodiment, the inner circumferential surface 131 of the accommodation part 13 and the outer circumferential surface 322 of the connection part 3 are screwed to each other by the internal thread 131*s* and the external thread 322*s*. An outer circumferential surface 132 of the accommodation part 13 of this embodiment is provided with an external thread 132*s*. The external thread 132*s* is screwed to an internal thread 42*s* formed on a nut 42 described later.

[First Flow Path]

As shown in FIG. 4 and FIG. 6, the terminal 11 includes the first flow path 10 through which the refrigerant flows inside the terminal 11. The terminal 11 has a front end part 12 positioned on the first end part 11*a* side. The front end part 12 of this embodiment is a tubular member having a closed front end and an open rear end. The rear end side of the front end part 12 communicates with the accommodation part 13. The inside of the front end part 12 and the inside of the accommodation part 13 communicate with each other. As shown in FIG. 6, the front end part 12 has an internal space that forms a part of the first flow path 10. The remainder of the first flow path 10 is formed between the accommodation part 13 and the connection part 3 as shown in FIG. 4. The remainder of the first flow path 10 will be described when describing the connection part 3 later.

In this embodiment, the outer circumferential surface of the front end part 12 on the rear end side has a through hole 121 as shown in FIG. 3. A tip portion of a first pipe 5 described later is inserted in the through hole 121. In this embodiment, the refrigerant is supplied from the first pipe 5 to the inside of the front end part 12.

As shown in FIG. 3, an inner member 122 is inserted in the internal space of the front end part 12. As shown in FIG. 6, the inner member 122 includes a partition 123, a stopper 124, and a fixture 125. In FIG. 6, the inner member 122 is shown in a side view to facilitate understanding. The partition 123 partitions the first flow path 10 formed in the internal space of the front end part 12 into an outward path and a return path. The stopper 124 guides the flow of the refrigerant so that the refrigerant flows from the outward path to the return path. The fixture 125 fixes the inner member 122 to the terminal 11 on the rear end side of the front end part 12. The partition 123, the stopper 124, and the fixture 125 are integrally molded.

The partition 123 is a plate-shaped member that divides the internal space of the front end part 12 into a plurality of small spaces. As shown in FIG. 6, the partition 123 includes a main body 123*b* and a ridge 123*p*. The partition 123 is configured such that the main body 123*b* and the ridge 123*p* intersect each other as viewed from the front side. The main body 123*b* and the ridge 123*p* are integrally molded.

The main body 123*b* is disposed so as to extend along the axial direction of the terminal 11. The main body 123*b* roughly divides the internal space of the front end part 12 into two spaces. The main body 123*b* has a first surface and a second surface. The first flow path 10 is formed between the first surface of the main body 123*b* and the inner circumferential surface of the front end part 12, and between the second surface of the main body 123*b* and the inner circumferential surface of the front end part 12. In this embodiment, such two first flow paths 10 having the partition 123 therebetween are joined at the front ends thereof. The main body 123*b* is disposed such that the side surface thereof faces the through hole 121. The side surface of the main body 123*b* connects the first surface and the second surface of the main body 123*b*. The refrigerant supplied from the first pipe 5 is diverted into the directions of the first surface and the second surface of the main body 123*b*.

The ridge 123*p* projects from each of the first surface and the second surface of the main body 123*b* toward the inner circumferential surface of the front end part 12. A tip of the ridge 123*p* is in contact with the inner circumferential surface of the front end part 12. The ridge 123*p* is disposed so as to extend along the axial direction of the terminal 11. A front end side of the ridge 123*p* does not reach the front end side of the main body 123*b*. That is, the length of the ridge 123*p* is shorter than the length of the main body 123*b*. Here, the "length" is a length along the axial direction of the terminal 11. The ridge 123*p* forms the outward path and the return path, through which the refrigerant flows. The length of the ridge 123*p* being shorter than the length of the main body 123*b* provides a halfway point between the outward path and the return path. The ridge 123*p* of this embodiment is disposed at the center in the width direction of the first surface or the second surface.

The stopper 124 is disposed on the rear end side of the main body 123*b*. Specifically, the stopper 124 is disposed on a side, facing the through hole 121, of the first flow path 10 divided by the ridge 123*p*. The stopper 124 is disposed on the rear end side with respect to the through hole 121. The stopper 124 of this embodiment is disposed at the boundary between the accommodation part 13 and the front end part 12. The stopper 124 is disposed so as to close the rear end side of the space formed by the main body 123*b*, the ridge 123*p*, and the inner circumferential surface of the front end part 12. The stopper 124 has a function of blocking the flow of the refrigerant. The stopper 124 of this embodiment is a semicircular plate member.

As shown in FIG. 6, in the first flow path 10, the partition 123 causes the refrigerant supplied from the first pipe 5 to flow as follows. That is, the refrigerant flows through the outward path formed by the ridge 123*p* toward the front end, is returned at the front end side of the ridge 123*p*, and flows through the return path formed by the ridge 123*p* toward the rear end side.

The fixture 125 is disposed at the boundary between the accommodation part 13 and the front end part 12. The fixture 125 includes a frame-shaped part 125*a*, and a plurality of coupling parts (not shown). The frame-shaped part 125*a* is connected to the inner circumferential surface of the terminal 11. The outer diameter of the frame-shaped part 125*a* is greater than an envelope circle formed by the main body 123*b* and the ridge 123*p*. The frame-shaped part 125*a* may be fixed by being adhered to the inner circumferential surface of the terminal 11. Alternatively, the frame-shaped part 125*a* may be fixed by being fitted in a groove formed in the inner circumferential surface of the terminal 11. The coupling parts (not shown) connect the frame-shaped part 125*a*, the main body 123*b*, and the rear end side of the ridge 123*p*. Each coupling part is an elongated strip. The plurality of coupling parts are disposed substantially equally in the circumferential direction of the frame-shaped part 125*a*. A hole is formed between adjacent coupling parts. The refrigerant can flow through the holes.

The material of the partition 123 may be, for example, a metal, a resin, or the like. Examples of the metal include copper, copper alloy, aluminum, aluminum alloy, and stainless steel. Examples of the resin include polyethylene (PE), polypropylene (PP), polyamide (PA), acrylonitrile-butadiene-styrene resin (ABS), polybutylene terephthalate (PBT), fluorine resin (PTFE), polycarbonate (PC), and polyphenylene sulfide (PPS).

[Housing]

The housing 15 shown in FIG. 2 and FIG. 3 is a resin molded body that covers the terminal 11. The housing 15 includes a distal end part 151 and a proximal end part 152. The distal end part 151 and the proximal end part 152 are integrated together.

The distal end part 151 is a part to be inserted in the inlet 1000 (FIG. 1). In this embodiment, the three-dimensional shape of the distal end part 151 is a substantially rectangular block shape. The "substantially rectangular" means that the shape may have a curved line. As shown in FIG. 2, the distal end part 151, in which the terminal 11 (FIG. 3) and the like are housed, includes a plurality of through holes 151*h*.

The proximal end part 152 is a part that is not inserted in the inlet 1000 (FIG. 1). That is, the proximal end part 152 is a part to be exposed from the inlet 1000 when the distal end part 151 is inserted in the inlet 1000 (FIG. 1). The proximal end part 152 is disposed so as to extend from the distal end part 151 toward the electric wire 2 side. A plurality of proximal end parts 152 may be provided according to the number of electric wires 2. In this embodiment, as shown in FIG. 2, two proximal end parts 152 are provided. The three-dimensional shape of each proximal end part 152 is tubular. The two proximal end parts 152 are connected by a coupling member (not shown). The inner diameter of each proximal end part 152 is set according to the outer diameter of the terminal 11 and the outer diameter of the connection part 3 described later. The inner diameter of the proximal end part 152 at the boundary with the distal end part 151 is substantially equal to the outer diameter of the front end part 12 of the terminal 11. The inner diameter of a portion of the proximal end part 152 facing the connection part 3 is substantially equal to the outer diameter of the connection part 3.

As shown in FIG. 3, a seal member 8*a* is disposed between the housing 15 and the terminal 11. As shown in FIG. 4, a seal member 8*b* is disposed between the accommodation part 13 of the terminal 11 and the connection part 3.

As shown in FIG. 3, each proximal end part 152 has a through hole 153 in which the first pipe 5 described later is inserted. A seal member 6 is disposed between an inner circumferential surface of the through hole 153 and the first pipe 5. The seal member 6 has a tubular shape. The seal member 6 has an extended part 60 located outside the housing 15. The extended part 60 also has a tubular shape. The extended part 60 is tapered such that the height on the inner circumferential side is greater than the height on the outer circumferential side. That is, the extended part 60 has a tapered end part on the distal side from the terminal 11. The tapered end part of the extended part 60 allows water on the upper surface of the seal member 6 to be easily discharged along a sloped surface of the tapered shape. Therefore, water is not likely to be collected on the upper surface of the seal member 6, thereby inhibiting intrusion of water from the through hole 153 into the housing 15.

As shown in FIG. 3, an end surface of the proximal end part 152 on the rear end side has a draw-out hole 154 from which the electric wire 2 described later is drawn out. A seal member 7 is disposed between an inner circumferential surface of the draw-out hole 154 and the electric wire 2. A fixture 155 is disposed on the end surface of the proximal end part 152 on the rear end side. The fixture 155 is a bottomed tubular member having an end portion 155*a* and a side portion 155*b*. The end portion 155*a* faces an end surface of the seal member 7. A surface, of the end portion 155*a*, facing the seal member 7 has a projection 155*p*. A tip of the projection 155*p* is in contact with the end surface of the seal member 7. The side portion 155*b* extends from the end portion 155*a* along the circumferential surface of the proximal end part 152. The side portion 155*b* and the proximal end part 152 are coupled to each other by a snap-fit structure. With the side portion 155*b* being coupled to the proximal end part 152, the projection 155*p* disposed on the end portion 155*a* is in contact with the seal member 7, thereby inhibiting the seal member 7 from falling out of the draw-out hole 154.

<<Electric Wire>>

As shown in FIG. 3 and FIG. 4, the electric wire 2 includes the conductor 21 and a second pipe 22. As shown in FIG. 4, the second flow path 20 is provided between the conductor 21 and the second pipe 22. The electric-wire-equipped connector 100 is usually provided with two electric wires 2 as shown in FIG. 2. One of the electric wires 2 is a positive wire while the other electric wire 2 is a negative wire. Although not shown, the electric-wire-equipped connector 100 includes a ground wire, a signal wire required for controlling charging or the like of the electric vehicle, and other wires, in addition to the electric wires 2.

[Conductor]

The conductor 21 is a power line for supplying electric power to the electric vehicle. The conductor 21 is electrically connected to the terminal 11 of the connector 1 via the connection part 3 described later. The conductor 21 is, for example, a twisted wire obtained by twisting a plurality of strands, a twisted wire obtained by further twisting a plurality of twisted wires, or a compressed conductor obtained by compression-molding the twisted wires. Examples of the material of the conductor 21 include copper, copper alloy, aluminum, and aluminum alloy. The conductor 21 itself is a high-temperature spot.

[Second Pipe]

As shown in FIG. 4, the second pipe 22 covers the conductor 21, and forms the second flow path 20 between itself and the conductor 21. A portion of the connection part 3 described later is inserted in an end portion of the second pipe 22 on the front end side. The second pipe 22 is fixed to the connection part 3 by the fixture 4. The fixture 4 includes a collar 41 and a nut 42. The connection part 3 includes an outer circumferential surface 322 facing an inner circumferential surface 221 of the second pipe 22. With the inner circumferential surface 221 of the second pipe 22 facing the outer circumferential surface 322 of the connection part 3, the collar 41 is disposed so as to cover the outer circumferential surface 222 of the second pipe 22. The nut 42 is disposed so as to cover the collar 41. An internal thread 42*s* is provided at an inner circumferential surface of the nut 42 on the front end side. The internal thread 42*s* is screwed to the external thread 132*s* provided at the outer circumferential surface 132 of the accommodation part 13 in the terminal 11. The second pipe 22 is fixed to the connection part 3 via the nut 42 and the collar 41 by the screwing of the internal thread 42*s* and the external thread 132*s*.

The material of the second pipe 22 may be, for example, rubber or flexible resin. Examples of rubber include silicone rubber, ethylene-propylene rubber, nitrile rubber, chloroprene rubber, and fluororubber. Examples of resin include PE, PP, and PA.

[Second Flow Path]

As shown in FIG. 4 and FIG. 6, the electric wire 2 includes the second flow path 20 through which the refrigerant flows along the longitudinal direction of the conductor 21. The second flow path 20 is provided for each electric wire 2. The second flow path 20 is connected to a cooling device (not shown).

Although not shown, the two electric wires 2, which have been drawn out from the draw-out hole 154 formed at the proximal end part 152 of the housing 15, are covered with a sheath 25 together with the first pipe 5 described later, as shown in FIG. 1. In other words, the two electric wires 2 and the first pipe 5, which are located outside the housing 15, are treated as one body because of the sheath 25. The material of the sheath 25 is, for example, chloroprene rubber or the like. An interposition may be disposed between the sheath 25, and the two electric wires 2 and the first pipe 5. The material of the interposition is, for example, ethylene-propylene rubber or the like.

<<Connection Part>>

The connection part 3 electrically connects the terminal 11 of the connector 1 to the conductor 21 of the electric wire 2. As shown in FIG. 4, the connection part 3 includes a third flow path 30 that allows the first flow path 10 formed in the terminal 11 and the second flow path 20 formed in the electric wire 2 to communicate with each other. As shown in FIG. 5, the connection part 3 includes a first tubular portion 31, a second tubular portion 32, and a coupling part 33. In FIG. 4, a communication opening 330 of the coupling part 33 is shown. The first tubular portion 31, the second tubular portion 32, and the coupling part 33 are integrally molded. The connection part 3 of this embodiment is inserted in the accommodation part 13 of the terminal 11.

As shown in FIG. 4, the first tubular portion 31 is located on the front end side of the accommodation part 13. The first tubular portion 31 is electrically and mechanically connected to the conductor 21. The conductor 21 is inserted in the first tubular portion 31. The first tubular portion 31 is compressed while the conductor 21 is inserted therein. This compression allows the inner circumferential surface 311 of the first tubular portion 31 to be coupled to the outer circumferential surface 212 of the conductor 21. A flow path through which the refrigerant flows is not formed inside the first tubular portion 31.

With the accommodation part 13 being inserted in the first tubular portion 31, a space is formed between the first tubular portion 31 and the accommodation part 13. This space is a part of the first flow path 10. That is, the outer circumferential surface 312 of the first tubular portion 31 forms the first flow path 10 between itself and the inner circumferential surface 131 of the accommodation part 13. The first flow path 10 formed between the accommodation part 13 and the first tubular portion 31 communicates with the first flow path 10 disposed in the front end part 12 of the terminal 11.

As shown in FIG. 4, the second tubular portion 32 is located on the rear end side of the accommodation part 13. The axis of the first tubular portion 31 and the axis of the second tubular portion 32 are coaxial. The second tubular portion 32 of this embodiment does not overlap the first tubular portion 31 in the axial direction. That is, the second tubular portion 32 of this embodiment is disposed side by side, in the axial direction, with the first tubular portion 31. The second tubular portion 32 is electrically and mechanically connected to the terminal 11.

The conductor 21 is inserted in the second tubular portion 32. The conductor 21, which is inserted in the first tubular portion 31 and the second tubular portion 32, is electrically and mechanically connected to the first tubular portion 31, but is not mechanically connected to the second tubular portion 32. With the conductor 21 being inserted in the second tubular portion 32, a space is formed between the second tubular portion 32 and the conductor 21. This space is a part of the third flow path 30. That is, the inner circumferential surface 321 of the second tubular portion 32 forms a part of the third flow path 30 between itself and the outer circumferential surface 212 of the conductor 21. The space between the inner circumferential surface 321 of the second tubular portion 32 and the outer circumferential surface 212 of the conductor 21 communicates with the second flow path 20 formed between the conductor 21 and the second pipe 22. That is, the third flow path 30 and the second flow path 20 communicate with each other.

The external thread **322*s* is provided at the outer circumferential surface 322 of the second tubular portion 32. The external thread 322*s* is screwed to the internal thread 131*s* provided at the inner circumferential surface 131 of the accommodation part 13. This screwing allows the outer circumferential surface 322 of the second tubular portion 32 to be coupled to the inner circumferential surface 131 of the accommodation part 13. A flow path through which the refrigerant flows is not formed between the outer circumferential surface 322 of the second tubular portion 32 and the inner circumferential surface 131 of the accommodation part 13**.

A projection **322*p* is provided at the outer circumferential surface 322 of the second tubular portion 32. The projection 322*p* of this embodiment slopes such that the outer diameter thereof increases from the rear end side toward the front end side. The projection 322*p* serves as a hook for hooking the second pipe 22. The second pipe 22 is fixed to the connection part 3 as described above. Specifically, with the inner circumferential surface 221 of the second pipe 22 facing the outer circumferential surface 322 of the connection part 3, the collar 41 is disposed so as to cover the outer circumferential surface 222 of the second pipe 22, and is fixed by the nut 42. The collar 41 and the nut 42 are disposed so as to cover the projection 322*p*. The collar 41 fills the space between the inner circumferential surface of the nut 42 and the outer circumferential surface 222 of the second pipe 22. The fixing by the collar 41 and the nut 42 causes the projection 322*p* to bite into the second pipe 22. This biting allows the second pipe 22 to be firmly fixed to the connection part 3**.

A flange **322*f* is provided at the outer circumferential surface 322 of the second tubular portion 32. The flange 322*f* protrudes radially outward of the second tubular portion 32. The flange 322*f* of this embodiment is disposed over the entire circumference of the second tubular portion 32. The flange 322*f* is disposed between the projection 322*p* and the external thread 322*s*. The flange 322*f* serves to position the collar 41 when the internal thread 42*s* of the nut 42 is screwed to the external thread 132*s* provided at the outer circumferential surface 132 of the accommodation part 13. Furthermore, an inner circumference projection that positions the collar 41 between itself and the flange 322*f* is disposed on the rear end side of the nut 42**.

As shown in FIG. 5, the coupling part 33 includes a plurality of short pieces 331 and a plurality of communication openings 330. Each short piece 331 couples the first tubular portion 31 to second tubular portion 32. The short pieces 331 are disposed substantially equally in the circumferential direction of the first tubular portion 31 and the second tubular portion 32. Each communication opening 330 is disposed between adjacent short pieces 331. The refrigerant can flow through each communication opening 330. Each communication opening 330 is the remainder of the third flow path 30. As shown in FIG. 4, each communication opening 330 communicates with the first flow path 10 that is formed between the outer circumferential surface 312 of the first tubular portion 31 and the inner circumferential surface 131 of the accommodation part 13.

A second connection place where the terminal 11 and the conductor 21 are connected by the connection part 3 becomes a high-temperature spot.

[Third Flow Path]

As shown in FIG. 4 and FIG. 6, the connection part 3 includes the third flow path 30 that allows the first flow path 10 and the second flow path 20 to communicate with each other. As described above, the third flow path 30 is composed of the space between the inner circumferential surface 321 of the second tubular portion 32 and the outer circumferential surface 212 of the conductor 21, and the communication openings 330. The first flow path 10, the second flow path 20, and the third flow path 30 are formed so as to correspond to each of a plurality of electric wires 2.

<<First Pipe>>

As shown in FIG. 3, the first pipe 5 communicates with the first flow path 10 formed inside the terminal 11. A side of the first pipe 5 opposite to the first flow path 10 is connected to the cooling device (not shown) via a communication pipe 52. The first pipe 5 is a supply pipe that supplies the refrigerant into the terminal 11, or a discharge pipe that discharges the refrigerant from the terminal 11. The first pipe 5 of this embodiment is a supply pipe. In this example, the refrigerant that has been cooled by the cooling device (not shown) is supplied to the first flow path 10 through the communication pipe 52 and the first pipe 5.

As shown in FIG. 2 and FIG. 3, most of the first pipe 5 is disposed outside the housing 15. As shown in FIG. 3, the tip portion of the first pipe 5 penetrates through the through hole 153 formed in the housing 15, and is inserted in the through hole 121 formed in the front end part 12 of the terminal 11. In this embodiment, the tip end surface of the first pipe 5 is substantially flush with the inner circumferential surface of the front end part 12. The tip portion of the first pipe 5 may be positioned inside the front end part 12 to an extent that flow of the refrigerant in the front end part 12 is not hindered.

As shown in FIG. 3, a flange 51 is provided at an end portion of the first pipe 5. The flange 51 is in contact with an area, near the through hole 121, of the outer circumferential surface of the front end part 12. The flange 51 being in contact with this area inhibits the tip portion of the first pipe 5 from excessively entering the terminal 11.

The material of the first pipe 5 may be the same as the material of the second pipe 22, for example.

<<Other Components>

[Case]

As shown in FIG. 1, the electric-wire-equipped connector 100 includes a case 9. The case 9 covers a connection area where the connector 1 and the electric wire 2 are connected. The case 9 of this embodiment covers a range from the boundary between the distal end part 151 and the proximal end part 152 in the housing 15 of the connector 1 to the sheath 25. A C-shaped grip is provided on the upper surface of the case 9. [Refrigerant]

The refrigerant that flows through the refrigerant flow paths formed in the electric-wire-equipped connector 100 is an insulating refrigerant having insulating properties. Examples of the refrigerant include fluorine-based inert liquid, and silicone oil.

<<Flow of Refrigerant>>

With reference to FIG. 4 and FIG. 6, flow of the refrigerant in the refrigerant flow path formed in the electric-wire-equipped connector 100 according to embodiment 1 will be described. The refrigerant flow path formed in the electric-wire-equipped connector 100 includes the first flow path 10, the second flow path 20, and the third flow path 30. In this embodiment, the refrigerant is supplied from the first pipe 5 being a supply pipe to the first flow path 10. In FIG. 4 and FIG. 6, the flow of the refrigerant in the first flow path 10 and the second flow path 20 is indicated by broken lines. In FIG. 4 and FIG. 6, the flow of the refrigerant in the third flow path 30 is indicated by solid lines. In FIG. 6, the flow of the refrigerant in the first pipe 5 is indicated by a two-dot-dash line.

As shown in FIG. 6, the refrigerant is supplied from the first pipe 5 to the first flow path 10 in the front end part 12. The refrigerant supplied to the first flow path 10 in the front end part 12 is caused to reciprocate inside the front end part 12 by the partition 123. Specifically, the refrigerant supplied to the first flow path 10 in the front end part 12 flows through the outward path formed by the ridge *123p* toward the front end side, is returned at the front end side of the ridge *123p*, and flows through the return path formed by the ridge *123p* toward the rear end side. The refrigerant that has flowed to the rear end side flows in the first flow path 10 in the accommodation part 13. The refrigerant that has flowed through the first flow path 10 in the accommodation part 13 flows between the outer circumferential surface 312 of the first tubular portion 31 and the inner circumferential surface 131 of the accommodation part 13 as shown in FIG. 4. Thereafter, the refrigerant flows into the connection part 3 through the communication opening 330 formed in the connection part 3, and flows through the third flow path 30 formed between the inner circumferential surface 321 of the second tubular portion 32 and the outer circumferential surface 212 of the conductor 21. The refrigerant that has flowed through the third flow path 30 flows into the second flow path 20 formed between the conductor 21 and the second pipe 22. The refrigerant that has flowed into the second flow path 20 flows to the cooling device (not shown) along the longitudinal direction of the conductor 21. The refrigerant that has flowed into the cooling device is cooled by the cooling device. The refrigerant cooled by the cooling device again flows through the communication pipe 52 and the first pipe 5, and is supplied to the first flow path 10.

In brief, the refrigerant flows, in order, through the first pipe 5, the first flow path 10, the third flow path 30, and the second flow path 20, which are connected to the cooling device (not shown), and is returned to the cooling device.

<<Effects of Embodiment 1>>

In the electric-wire-equipped connector 100 according to embodiment 1, the above-described flow of the refrigerant efficiently cools a plurality of high-temperature spots. The reason why such efficient cooling can be performed is that the first pipe 5, the first flow path 10, the third flow path 30, and the second flow path 20 are sequentially connected to form a series of flow paths. The plurality of high-temperature spots are cooled by the refrigerant that flows through the series of flow paths. The plurality of high-temperature spots include the first connection place, the second connection place, and the conductor 21 itself. The first connection place is a place where the socket terminal (not shown) provided in the electric vehicle is connected to the terminal 11. The second connection place is a place where the terminal 11 is connected to the conductor 21. The first connection place is cooled by the refrigerant that flows through the first flow path 10. The second connection place is cooled by the refrigerant that flows through the third flow path 30. The conductor 21 is cooled by the refrigerant that flows through the second flow path 20. Since the electric-wire-equipped connector 100 of embodiment 1 can efficiently cool the plurality of high-temperature spots, a large current value for charging or discharging can be ensured, whereby high-power charging or discharging can be achieved in a short time.

The electric-wire-equipped connector 100 of embodiment 1 can realize miniaturization. The reason why miniaturization can be realized is that the connection part 3 has both the function of connecting the terminal 11 and the conductor 21, and the function of allowing the first flow path 10 and the second flow path 20 to communicate with each other. The electric-wire-equipped connector 100 having the above two functions can be easily miniaturized, compared to an electric-wire-equipped connector in which the above two functions are separately achieved. In particular, since the connection part 3 is inserted in the accommodation part 13 of the terminal 11, the electric-wire-equipped connector 100 is further miniaturized. Since the external thread 322*s* formed at the outer circumferential surface 322 of the connection part 3 and the internal thread 131*s* formed at the inner circumferential surface 131 of the accommodation part 13 are screwed to each other, the electric-wire-equipped connector 100 is miniaturized, and moreover, the connection part 3 and the terminal 11 in the electric-wire-equipped connector 100 are easily and reliably connected to each other.

Embodiment 2

Figure 7:
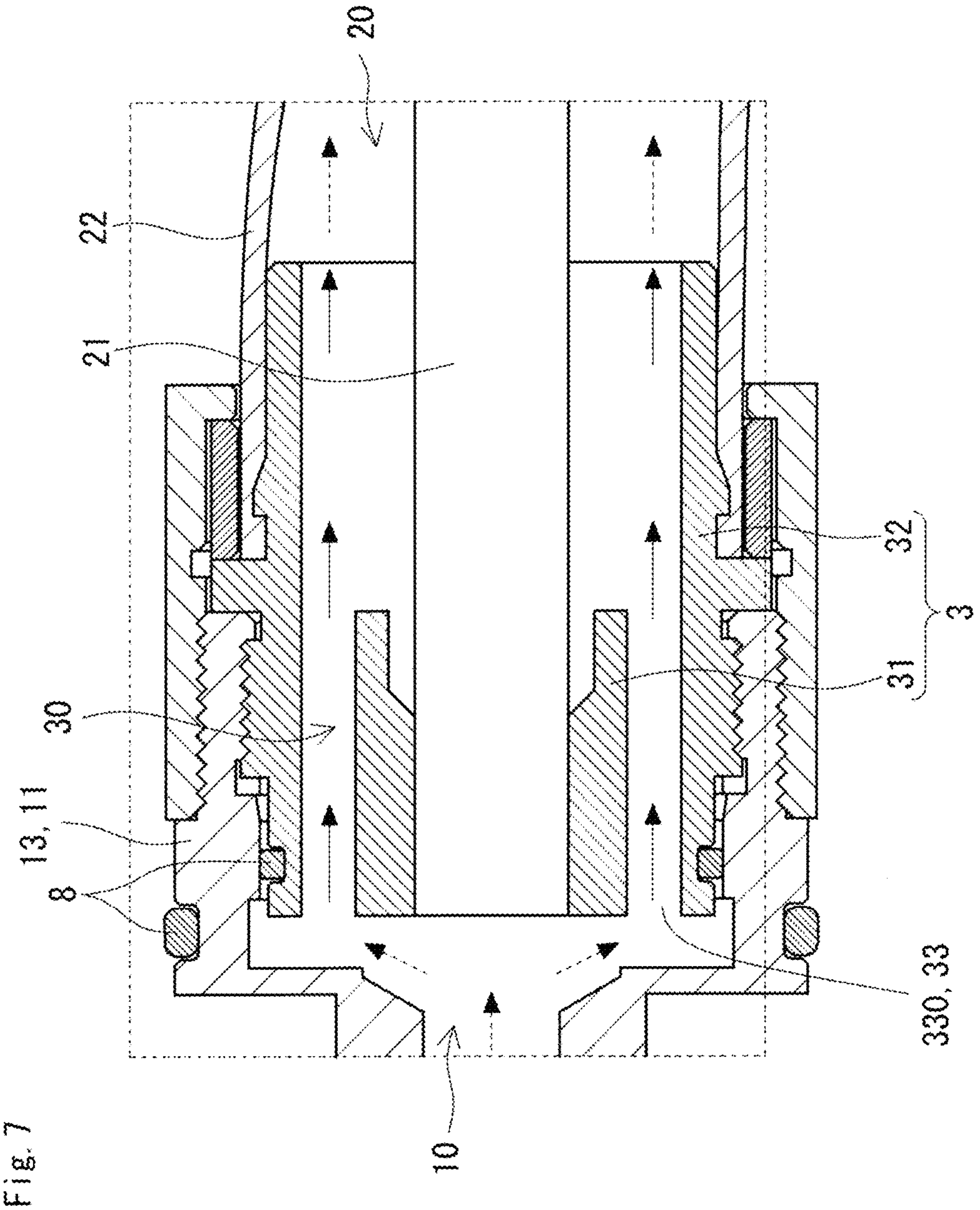
FIG. 7 is a cross-sectional view schematically showing a place where a terminal, an electric wire, and a connection part of an electric-wire-equipped connector according to embodiment 2 are connected to each other.

An electric-wire-equipped connector according to embodiment 2 will be described with reference to FIG. 7. FIG. 7 shows a vertical cross-section taken along a plane that passes the center axis of the terminal 11 and the center axis of the conductor 21 so as to include a connection area where the terminal 11 and the conductor 21 are connected. FIG. 7 shows an enlarged view of the connection area.

The electric-wire-equipped connector of embodiment 2 is different from the electric-wire-equipped connector 100 of embodiment 1 in the configuration of the connection part 3. Hereinafter, differences from embodiment 1 will be mainly described, and description of the same components as in embodiment 1 will be omitted.

<<Connection Part>>

The connection part 3 includes the first tubular portion 31, the second tubular portion 32, and the coupling part 33. In FIG. 7, a communication opening 330 in the coupling part 33 is shown. The first tubular portion 31, the second tubular portion 32, and the coupling part 33 are integrally molded. The connection part 3 of this embodiment is inserted in the accommodation part 13 of the terminal 11 as in embodiment 1.

The first tubular portion 31 is located on the front end side of the accommodation part 13 while being disposed inside the second tubular portion 32 described later. The first tubular portion 31 is electrically and mechanically connected to the conductor 21. The conductor 21 is inserted in the first tubular portion 31. The first tubular portion 31 is coupled to the conductor 21 while the conductor 21 is inserted therein. A flow path through which the refrigerant flows is basically not provided inside the first tubular portion 31.

The conductor 21 to which the first tubular portion 31 is coupled is disposed inside the second tubular portion 32. The second tubular portion 32 is disposed from the front end side to the rear end side of the accommodation part 13. A part of the second tubular portion 32 overlaps the first tubular portion 31 in the axial direction. The axis of the first tubular portion 31 and the axis of the second tubular portion 32 are coaxial. The second tubular portion 32 is electrically and mechanically connected to the terminal 11.

While the conductor 21 to which the first tubular portion 31 is coupled is inserted in the second tubular portion 32, spaces are formed between the second tubular portion 32 and the first tubular portion 31, and between the second tubular portion 32 and the conductor 21. These spaces form a part of the third flow path 30. The space formed between the first tubular portion 31 and the second tubular portion 32 communicates with the first flow path 10 through the communication openings 330 described later. That is, the third flow path 30 communicates with the first flow path 10 through the communication openings 330 described later. The space between the second tubular portion 32 and the conductor 21 communicates with the second flow path 20.

The coupling part 33 includes a plurality of short pieces (not shown) that couple the first tubular portion 31 to the second tubular portion 32, as in embodiment 1. The short pieces of this embodiment radially extend between the first tubular portion 31 and the second tubular portion 32. The short pieces are disposed substantially equally in the circumferential direction of the first tubular portion 31 and the second tubular portion 32. Each communication opening 330 is disposed between adjacent short pieces. The refrigerant can flow through each communication opening 330. Each communication opening 330 is the remainder of the third flow path 30.

<<Effects of Embodiment 2>>

In the electric-wire-equipped connector of embodiment 2, as in the electric-wire-equipped connector 100 of embodiment 1, the first flow path 10, the third flow path 30, and the second flow path 20 are sequentially connected to form a series of flow paths, whereby a plurality of high-temperature spots can be efficiently cooled. In the electric-wire-equipped connector of embodiment 2, since the first tubular portion 31 is housed in the second tubular portion 32 in the connection part 3, the size of the electric-wire-equipped connector 100 in the axial direction can be reduced. Therefore, the electric-wire-equipped connector of embodiment 2 can be more easily miniaturized, compared to the electric-wire-equipped connector 100 of embodiment 1.

Embodiment 3

Figure 8:
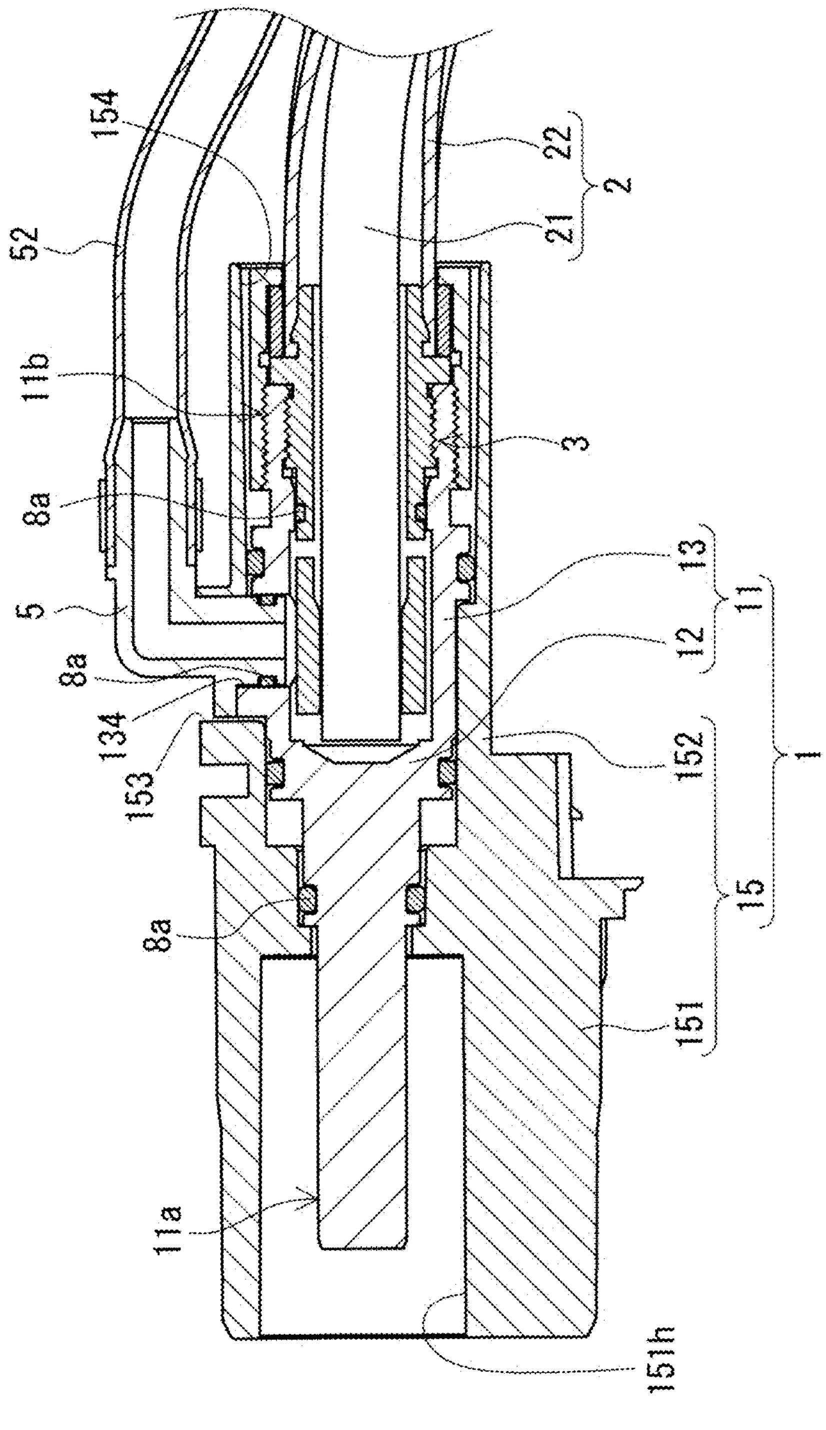
FIG. 8 is a cross-sectional view schematically showing the inside of an electric-wire-equipped connector according to embodiment 3.
Figure 9:
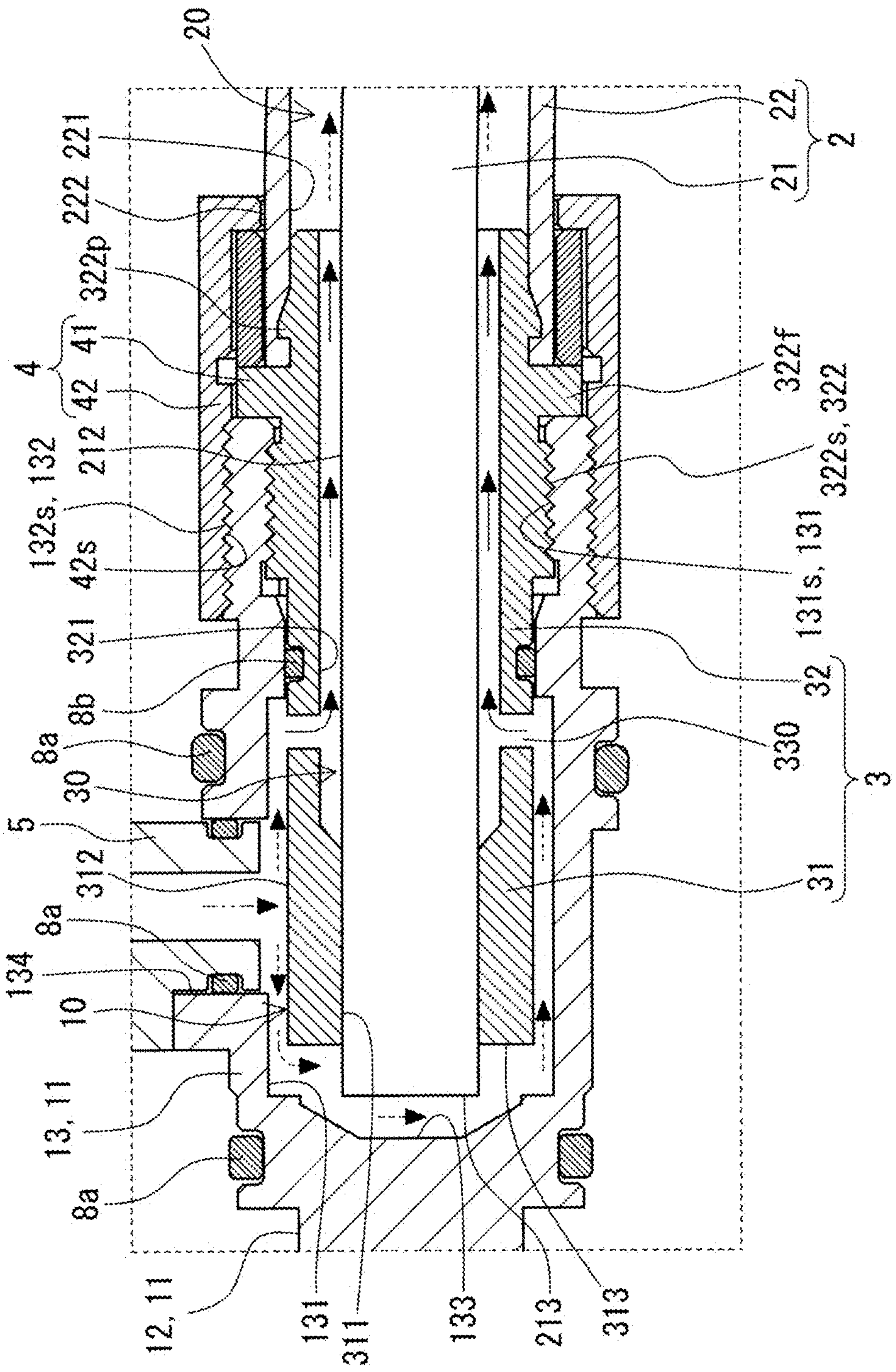
FIG. 9 illustrates a flow of a refrigerant in the electric-wire-equipped connector according to embodiment 3.

An electric-wire-equipped connector according to embodiment 3 will be described with reference to FIG. 8 and FIG. 9. FIG. 8 shows a vertical cross-sectional view of the inside of the electric-wire-equipped connector, taken along a plane that passes the center axis of the terminal 11 and the center axis of the conductor 21 so as to include a connection area where the terminal 11 and the conductor 21 are connected to each other. FIG. 9 shows an enlarged view of the connection area. In FIG. 9, the flow of the refrigerant in the first flow path 10, the second flow path 20, and the third flow path 30 are indicated by arrows, as in FIG. 4.

The electric-wire-equipped connector of embodiment 3 is different from the electric-wire-equipped connector 100 of embodiment 1 in the form of the terminal 11 and the position of the first pipe 5. In the electric-wire-equipped connector of embodiment 3, the configuration of the electric wire 2, the configuration of the connection part 3, the connection structure between the conductor 21 of the electric wire 2 and the connection part 3, and the connection structure between the terminal 11 and the connection part 3 are identical to those in the electric-wire-equipped connector 100 of embodiment 1. Hereinafter, differences from embodiment 1 will be mainly described, and description of the same components as in embodiment 1 will be omitted.

<<Terminal>>

The front end part 12 of the terminal 11 is not provided with a flow path through which the refrigerant flows. The front end part 12 of this embodiment is a solid body.

The accommodation part 13 of the terminal 11 has the first flow path 10 between itself and the first tubular portion 31 of the connection part 3, as in embodiment 1. Spaces are formed between the inner circumferential surface 131 of the accommodation part 13 and the outer circumferential surface 312 of the first tubular portion 31, and between a front end surface 133 of the accommodation part 13 and a front end surface 313 of the first tubular portion 31. These spaces form the first flow path 10. In this embodiment, the front end of the conductor 21 is exposed from the first tubular portion 31. A space is also formed between a front end surface 213 of the conductor 21 and a front end surface 133 of the accommodation part 13. This space also forms the first flow path 10.

A through hole 134 is formed in the outer circumferential surface of the accommodation part 13. The tip portion of the first pipe 5 is inserted in the through hole 134. In this embodiment, the refrigerant is supplied from the first pipe 5 to the inside of the accommodation part 13.

<<First Pipe>>

As shown in FIG. 8, the first pipe 5 penetrates the through hole 153 formed in the housing 15, and is inserted in the through hole 134 formed in the accommodation part 13. In this example, the tip end surface of the first pipe 5 is substantially flush with the inner circumferential surface 131 of the accommodation part 13. The tip portion of the first pipe 5 may be positioned inside the accommodation part 13 to an extent that flow of the refrigerant in the accommodation part 13 is not hindered. The first pipe 5 communicates with the first flow path 10 inside the accommodation part 13.

A seal member **8*a* is disposed between the first pipe 5 and the through hole 134 formed in the accommodation part 13. In this embodiment, the seal member 6 shown in FIG. 3 is not disposed between the first pipe 5 and the through hole 153 formed in the housing 15. The seal member 6 shown in FIG. 3 may be formed between the first pipe 5 and the through hole 153**.

<<Others>>

In this embodiment, the seal member 7 shown in FIG. 3 is not disposed between the electric wire 2 and the draw-out hole 154, of the housing 15, through which the electric wire 2 is drawn out. In this embodiment, the fixture 155 shown in FIG. 3 is not disposed on the end surface of the housing 15 on the rear end side. The seal member 7 shown in FIG. 3 may be disposed between the draw-out hole 154 and the electric wire 2. The fixture 155 shown in FIG. 3 may be disposed on the end surface of the housing 15 on the rear end side.

<<Flow of Refrigerant>>

As shown in FIG. 9, the refrigerant is supplied from the first pipe 5 to the first flow path 10 in the accommodation part 13. The refrigerant supplied to the first flow path 10 in the accommodation part 13 flows between the inner circumferential surface 131 of the accommodation part 13 and the outer circumferential surface 312 of the first tubular portion 31, and between the front end surface 133 of the accommodation part 13 and the front end surface 313 of the first tubular portion 31. Thereafter, the refrigerant flows into the connection part 3 from the communication openings 330 formed in the connection part 3, and flows through the third flow path 30 formed between the inner circumferential surface 321 of the second tubular portion 32 and the outer circumferential surface 212 of the conductor 21. The refrigerant that has flowed through the third flow path 30 flows into the second flow path 20 formed between the conductor 21 and the second pipe 22. The refrigerant that has flowed into the second flow path 20 flows to the cooling device (not shown) along the longitudinal direction of the conductor 21. The refrigerant that has flowed into the cooling device is cooled by the cooling device. The refrigerant cooled by the cooling device again flows through the first pipe 5 and is supplied to the first flow path 10 via the communication pipe 52 shown in FIG. 8.

<<Effects of Embodiment 3>>

In the electric-wire-equipped connector of embodiment 3, as in the electric-wire-equipped connector 100 of embodiment 1, the first flow path 10, the third flow path 30, and the second flow path 20 are sequentially connected to form a series of flow paths, whereby a plurality of high-temperature spots can be efficiently cooled. Although the electric-wire-equipped connector of embodiment 3 is not provided with a flow path in the front end part 12 of the terminal 11, the refrigerant flows through the first flow path 10 in the accommodation part 13. Therefore, in the electric-wire-equipped connector of embodiment 3, as in the electric-wire-equipped connector of embodiment 1, the front end part 12 is quickly cooled, thereby quickly cooling the connection place where the terminal 11 and the socket terminal (not shown) provided in the electric vehicle are connected.

REFERENCE SIGNS LIST

100 electric-wire-equipped connector
1 connector
10 first flow path
11 terminal
**11*a*** first end part
**11*b*** second end part
12 front end part
121 through hole
122 inner member
123 partition
**123*b*** main body
**123*p*** ridge
124 stopper
125 fixture
**125*a*** frame-shaped part
13 accommodation part
131 inner circumferential surface
**131*s*** internal thread
132 outer circumferential surface
**132*s*** external thread
133 front end surface
134 through hole
15 housing
151 distal end part
**151*h*** through hole
152 proximal end part
153 through hole
154 draw-out hole
155 fixture
**155*a*** end portion
**155*b*** side portion
**155*p*** projection
2 electric wire
20 second flow path

21 conductor
212 outer circumferential surface
213 front end surface
22 second pipe
221 inner circumferential surface
222 outer circumferential surface
25 sheath
3 connection part
30 third flow path
31 first tubular portion
311 inner circumferential surface
312 outer circumferential surface
313 front end surface
32 second tubular portion
321 inner circumferential surface
322 outer circumferential surface
**322*s*** external thread
**322*p*** projection
**322*f*** flange
33 coupling part
330 communication opening
331 short piece
4 fixture
41 collar
42 nut
**42*s*** internal thread
5 first pipe
51 flange
52 communication pipe
6, 7, **8*a*, 8*b*** seal member
60 extended part
9 case
1000 inlet

The invention claimed is:

1. An electric-wire-equipped connector used for charging an electric vehicle or discharging the electric vehicle,
- the electric-wire-equipped connector comprising a connector, an electric wire, and a connection part, wherein
- the connector includes a rod-shaped terminal to be connected to a socket terminal provided in the electric vehicle,
- the rod-shaped terminal includes a first flow path through which a refrigerant flows inside the rod-shaped terminal,
- the electric wire includes a conductor, and a second flow path through which the refrigerant flows along a longitudinal direction of the conductor, and
- the connection part connects the rod-shaped terminal and the conductor, and includes a third flow path that allows the first flow path and the second flow path to communicate with each other,
- wherein the rod-shaped terminal includes an accommodation part in which the connection part is inserted, and
- wherein an inner circumferential surface of the accommodation part and an outer circumferential surface of the connection part are coupled to each other.

2. The electric-wire-equipped connector according to claim 1, wherein
- the electric wire includes a second pipe that covers the conductor, and forms the second flow path between itself and the conductor,
- the connection part has an outer circumferential surface that faces an inner circumferential surface of the second pipe, and
- the connector includes a fixture that fixes the second pipe to the connection part, with the inner circumferential surface of the second pipe and the outer circumferential surface of the connection part facing each other.

3. The electric-wire-equipped connector according to claim 1, wherein
- the connector includes a housing that covers the rod-shaped terminal,
- the housing includes a draw-out hole through which the electric wire is drawn out, and
- the connector includes a second seal member disposed between an inner circumferential surface of the draw-out hole and the electric wire.

4. The electric-wire-equipped connector according to claim 1, wherein
- the connector includes a first pipe fixed to the rod-shaped terminal, and
- the first flow path allows an inside of the first pipe and the third flow path to communicate with each other.

5. The electric-wire-equipped connector according to claim 4, wherein
- the connector includes a housing that covers the rod-shaped terminal,
- the housing has a through hole in which the first pipe is inserted, and
- the connector includes a first seal member disposed between an inner circumferential surface of the through hole and the first pipe.

6. The electric-wire-equipped connector according to claim 5, wherein
- the first seal member has an extended part located outside the housing, and
- the extended part has a tapered shape in which a height on an inner circumferential side is higher than a height on an outer circumferential side.

7. An electric-wire-equipped connector used for charging an electric vehicle or discharging the electric vehicle,
- the electric-wire-equipped connector comprising a connector, an electric wire, and a connection part, wherein
- the connector includes a rod-shaped terminal to be connected to a socket terminal provided in the electric vehicle,
- the rod-shaped terminal includes a first flow path through which a refrigerant flows inside the rod-shaped terminal,
- the electric wire includes a conductor, and a second flow path through which the refrigerant flows along a longitudinal direction of the conductor, and
- the connection part connects the rod-shaped terminal and the conductor, and includes a third flow path that allows the first flow path and the second flow path to communicate with each other,
- wherein the rod-shaped terminal includes an accommodation part in which the connection part is inserted, and
- wherein an inner circumferential surface of the accommodation part and an outer circumferential surface of the connection part are coupled to each other,
- wherein
  - the connection part includes a first tubular portion, a second tubular portion, and a coupling part,
  - the first tubular portion
    - is located on a front end side of the rod-shaped terminal, and
    - includes an inner circumferential surface coupled to an outer circumferential surface of the conductor, and an outer circumferential surface that forms the first flow path between itself and the inner circumferential surface of the accommodation part, the second tubular portion is located on a rear end side of the rod-shaped terminal with respect to the first tubular portion, and includes an inner circumferential surface that forms a part of the third flow path between itself and the outer circumferential surface of the conductor, and an outer circumferential surface coupled to the inner circumferential surface of the accommodation part, the coupling part includes a plurality of short pieces that couple the first tubular portion to the second tubular portion, and a plurality of communication openings formed between adjacent short pieces, and each of the plurality of communication openings is connected to the first flow path.

8. An electric-wire-equipped connector used for charging an electric vehicle or discharging the electric vehicle, the electric-wire-equipped connector comprising a connector, an electric wire, and a connection part, wherein the connector includes a rod-shaped terminal to be connected to a socket terminal provided in the electric vehicle, the rod-shaped terminal includes a first flow path through which a refrigerant flows inside the rod-shaped terminal, the electric wire includes a conductor, and a second flow path through which the refrigerant flows along a longitudinal direction of the conductor, and the connection part connects the rod-shaped terminal and the conductor, and includes a third flow path that allows the first flow path and the second flow path to communicate with each other, wherein the rod-shaped terminal includes an accommodation part in which the connection part is inserted, and wherein an inner circumferential surface of the accommodation part and an outer circumferential surface of the connection part are coupled to each other, wherein the rod-shaped terminal includes an accommodation part in which the connection part is inserted, and wherein an inner circumferential surface of the accommodation part and an outer circumferential surface of the connection part are coupled to each other, wherein the inner circumferential surface of the accommodation part and the outer circumferential surface of the connection part are screwed to each other.

* * * * *